United States Patent
Witkin

(10) Patent No.: US 8,358,311 B1
(45) Date of Patent: Jan. 22, 2013

(54) INTERPOLATION BETWEEN MODEL POSES USING INVERSE KINEMATICS

(75) Inventor: Andrew Witkin, Oakland, CA (US)

(73) Assignee: Pixar, Emeryville, CA (US)

( * ) Notice: Subject to any disclaimer, the term of this patent is extended or adjusted under 35 U.S.C. 154(b) by 793 days.

(21) Appl. No.: 12/257,257

(22) Filed: Oct. 23, 2008

Related U.S. Application Data

(60) Provisional application No. 60/982,122, filed on Oct. 23, 2007.

(51) Int. Cl.
*G06T 13/00* (2011.01)
(52) U.S. Cl. .................................... 345/474; 345/475
(58) Field of Classification Search ............... 345/474, 345/475
See application file for complete search history.

(56) References Cited

U.S. PATENT DOCUMENTS
7,202,869 B2   4/2007   Tooley et al.

OTHER PUBLICATIONS

Kallmann et al. "Hierarchical Motion Controllers for Real-Time Autonomous Virtual Humans" In Proceedings of the 5th International Working Conference on Intelligent Virtual Agents (IVA), Kos, Greece, Sep. 12-14, 2005, pp. 1-10.*

Neff et al. "Modeling Relaxed Hand Shape for Character Animation" AMDO 2006, pp. 264-269.*

Gleicher, Michael L.; "A Differential Approach to Graphical Interaction" University (CMU-CS-94-217); PhD Thesis, School of Computer Science, Carnegie Mellon; 1994; pp. i-xii, 1-250; Carnegie Mellon University, Pittsburgh, PA.

Witkin, Andrew et al.; "Interactive Dynamics"; *ACM SIGGRAPH Computer Graphics;* Mar. 1990; pp. 11-21; vol. 24, Issue 2; ACM.

* cited by examiner

*Primary Examiner* — Maurice L McDowell, Jr.
(74) *Attorney, Agent, or Firm* — Philip H. Albert; Kilpatrick Townsend & Stockton, LLP

(57) ABSTRACT

The pose of the model at an evaluation time is determined by interpolating pose attributes of the unconstrained pose degrees of freedom from previously defined poses. A neutral value of an attractor function at the evaluation time is based at least on the pose attributes of the unconstrained pose degrees of freedom. Because of this, the attractor function is time coherent. Similarly, pose constraints are determined by interpolating from previously defined pose constraints. Inverse kinematics or error minimization techniques modify the pose attributes of the unconstrained pose degrees of freedom to minimize the difference between the attractor function value for the pose attributes and the neutral value of the attractor function. The final pose of the model at the evaluation time is specified by the pose attributes corresponding with this minimization.

30 Claims, 7 Drawing Sheets

INTERPOLATION BETWEEN MODEL POSES USING INVERSE KINEMATICS

CROSS-REFERENCE TO RELATED APPLICATIONS

This application claims priority to U.S. Provisional Patent Application No. 60/982,122, filed Oct. 23, 2007, which is incorporated by reference herein for all purposes.

BACKGROUND

The present invention relates to the field of computer graphics, and in particular to methods and apparatus for interpolating model poses of computer graphics objects. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking rendered images and animations.

In computer-generated animation, an object's appearance is defined by a three-dimensional computer model. To appear realistic, the computer model of an object is often extremely complex, having millions of surfaces and tens of thousands of attributes. A pose is the realized geometry of a model. Animators often specify poses of models at one or more discrete moments of time, referred to as keyframes. Animation software tools then determine the poses of models at any intermediate moments of time, referred to as in-between or intermediate frames.

Due to the complexity involved with animating models, particularly character models with hundreds or thousands of degrees of freedom, animation tools often rely on animation variables to define the animation of objects. Animators typically define animation variable values, such as joint angles and joint positions, at specific frames or discrete moments of time. The value of an animation variable along with its associated time is referred to as a control knot. Animation tools often interpolate animation variable values between control knots to determine the poses of models at other frames or moments of time. The values of animation variables in any given frame define the pose or realized geometry of a model, which may include the position, orientation, surface and/or volume deformation, and potentially other properties of the character model.

The pose of some types of models may be defined using complex hierarchies of joints. For example, a character model can include a shoulder joint connected between a torso model and an upper arm model, an elbow joint connected between the upper arm model and a lower arm model, a wrist joint connected between the lower arm model and a hand model, and several finger joints connected between the hand model and finger models. The pose or position and orientation of all of these portions of the character model's arm is specified at least in part by the joint rotation angles and/or joint positions of the shoulder joint, the elbow joint, the wrist joint, and the finger joints.

Animators can specify the joint rotation angles of joints or other parameters or properties of a model directly to define a pose of a character model. This is referred to as forward kinematics. However, this is often time consuming and unintuitive, especially for limbs and other objects composed of numerous joints or complex parameters.

Inverse kinematics allows animators to specify all or a portion of a pose in terms of desired joint positions for a portion of the joints or other desired characteristics of all or a portion of a model. The animation tools then determine the specific joint rotation angles, joint positions, and other parameters, such as scaling or shearing, for the other joints required to achieve this pose. For example, an animator may specify that the hand of character model should contact another object in a scene. The animation tools then calculate the joint rotation angles for the shoulder, elbow, and wrist joints necessary for the hand to contact the object as specified. Animation tools often take into account constraints, such as limits on the range of joint rotations, to ensure that the final pose of the model appears realistic. For example, an elbow joint may be constrained to a range of 150 degrees of rotation to prevent the animation tools from setting this joint's rotation angles outside of the range of motion possible in human anatomy.

Although inverse kinematics often makes posing character models easier, animation can be a problem with inverse kinematics. A user may typically specify the poses of a model in two or more keyframes. The animation tools then determine the pose of the model for one or more intermediate frames to produce animation. Interpolation is one technique for determining the pose of a model in an intermediate frame. Inverse kinematics may be used to determine all or a portion of the poses in keyframes. Linear or non-linear interpolation is then used to determine pose attributes such as joint angles at the intermediate frames. For the keyframes, inverse kinematics ensures that all the joint constraints are satisfied. However, typical linear or non-linear interpolation techniques do not satisfy these constraints at intermediate frames. Thus, even if the starting and ending positions of a model in the keyframes appear normal and satisfy the constraints, typical interpolation techniques often produce awkward and unrealistic poses in the intermediate frames, often with many temporal discontinuities or sudden "popping" between different poses.

Another animation technique applies an inverse kinematic techniques simulation over time to determine the poses of a model in intermediate frames. In this approach, the animation tool applies inverse kinematics techniques to consider the joint constraints in each intermediate frame. Although this approach produces fluid and realistic looking animations, this approach requires animation tools to start its calculations at the first frame of animated sequence and incrementally determine the pose at every subsequent frame up to the desired intermediate frame. If anything in the animation sequence in changed, the entire sequence of calculations must be repeated from the beginning. Because animators often make incremental adjustments to fine-tune their animations, simulating inverse kinematics over time makes the process of fine-tuning animation difficult and time-consuming for animators.

There is also an unmet need for a system and method to animate models using inverse kinematics in a realistic and time-coherent manner without requiring computationally expensive incremental simulations of long sequences of animation frames.

SUMMARY

An embodiment of the invention receives pose attribute values specifying first and second poses of a model and an evaluation time. Each pose of the model includes pose constraints.

To determine the pose of the model at the evaluation time, an embodiment of the invention first determines initial pose attribute values at the evaluation time for the unconstrained pose degrees of freedom. In an embodiment, linear or non-linear interpolation may be used to determine these initial pose attribute values at the evaluation time for the unconstrained degrees of freedom based on the pose attribute values of these pose degrees of freedom in the first and second poses, and optionally additional poses.

An embodiment of the invention sets a neutral value of the attractor function based on the initial pose at the evaluation time. The neutral value of the attractor function represents a desired characteristic of the model shape or geometry, such as a potential energy minimum or a constant curvature. The desired shape of the model represented by the neutral value of the attractor function may be based on the pose attribute values of all or a portion of the pose degrees of freedom of the model, on values derived therefrom, or on any attribute of the pose of the model.

An embodiment of the invention also determines pose constraints at the evaluation time, for example using linear or non-linear interpolation of the corresponding pose constraints in at least the first and second poses.

An embodiment of the invention determines a value of the attractor function at the evaluation time based on the pose of the model at the evaluation time. An embodiment of the invention uses inverse kinematics or error minimization techniques to modify the pose at the evaluation time so that the total difference between the value of the attractor function and the neutral value of the attractor function is minimized and the pose constraints at the evaluation time are satisfied. The result of this minimization is the final pose of the model at the evaluation time.

BRIEF SUMMARY OF THE DRAWINGS

The invention will be described with reference to the drawings, in which.

In the drawings, identical reference numbers indicate identical components.

DETAILED DESCRIPTION

Figure 1A:
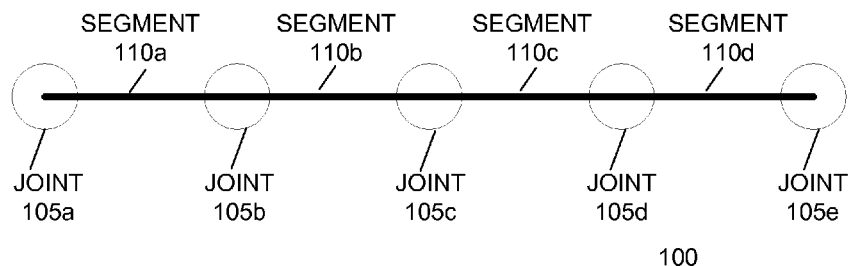
FIGS. 1A-1C illustrate an example usage of inverse kinematics in an animation tool according to an embodiment of the invention.
Figure 1B:
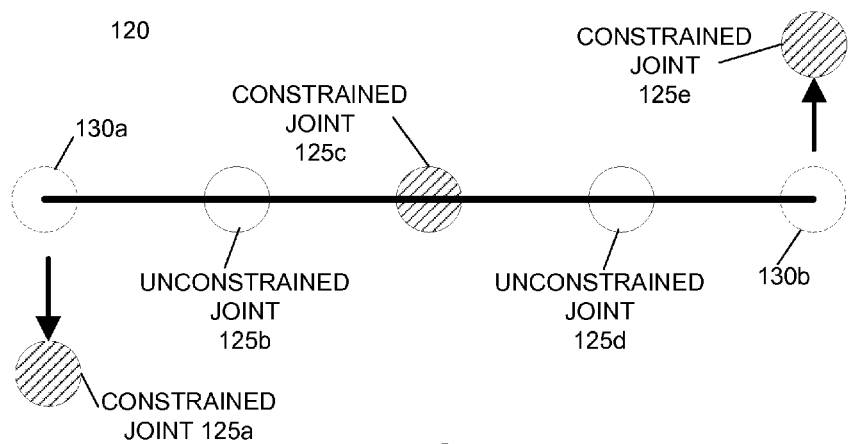
Figure 1C:
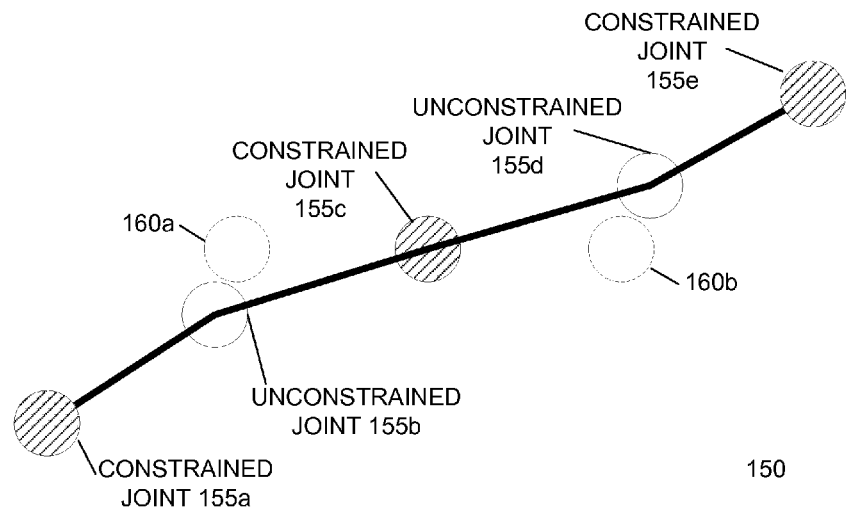

FIGS. 1A-1C illustrate an example usage of inverse kinematics in an animation tool according to an embodiment of the invention. FIG. 1A illustrates a simplified view of a jointed model 100 including five joints 105a-105e connected via four model segments 110a-110d. The jointed model 100 is in an initial rest pose, which is the default pose of the jointed model 100. The jointed model 100 is illustrated in two dimensions for clarity, although embodiments of the invention are intended for use with three-dimensional models as well.

Users and other applications can specify constraints for one or more joints of the jointed model. A joint constraint can set the position, rotation angle, scaling, shearing, and/or any other attribute of a joint or an associated portion of the jointed model. Furthermore, joint constraints may only partially constrain an attribute of a joint. For example, a joint constraint may specify a joint position in two dimensions, e.g. x and y, and allow the joint to move freely in a third dimension, e.g. z.

FIG. 1B illustrates a jointed model 120 corresponding with the jointed model of FIG. 1A with joint constraints assigned. In FIG. 1B, the leftmost, center, and rightmost joints 125a, 125c, and 125e are assigned joint constraints, which is indicated in the figures by shading. The other two joints 125b and 125d remain unconstrained. In this example, the leftmost and rightmost joints 125a and 125e are moved from their positions 130a and 130b in the rest pose to new positions. The center joint is constrained to its position in the rest pose.

In response to the setting of joint constraints, an animation tool determines the attributes, such as the positions and rotation angles, of the remaining unconstrained joints using inverse kinematics. Embodiments of the invention can use any inverse kinematic solution technique known in the art. For example, a typical inverse kinematic solution technique uses an energy function to determine a potential energy value for a pose of the jointed model. The rest pose of the jointed model typically has a minimum or zero potential energy value. Joints with attributes different from those in the rest pose, such as joints moved to different positions, increase the potential energy of the jointed model. For example, a joint may be assigned a rotation spring force of the form $F=k(\Delta\theta)$, where $\Delta\theta$ is the difference between a joint's current rotation angle and its angle in the rest pose and k is a joint spring constant, and a potential energy of $U=\frac{1}{2}k\Delta\theta^2$. An animation tool attempts to minimize the total potential energy of the jointed model by manipulating the attributes of the unconstrained joints.

FIG. 1C illustrates a final pose of a jointed model 150 following the application of inverse kinematics techniques. Jointed model 150 include joints 155a-155e, corresponding with the joints 125a-125e of jointed model 120. The constrained joints 155a, 155c, and 155d remain in the same positions as shown in FIG. 1B. However, the animation tool has used inverse kinematics techniques to determine new positions of unconstrained joints 155b and 155d. As a result, the unconstrained joints 155b and 155d have moved from their rest pose positions 160a and 160b, corresponding with their positions shown in FIGS. 1A and 1B to the new positions shown in FIG. 1C.

Some animation tools allow users to interactively pose jointed models using inverse kinematics. For example, a user may move, rotate, scale, or shear a joint or associated model segment using keyboard, mouse, or other input. As the user manipulates the joint, the animation tool uses inverse kinematics to change attributes, such as the position and joint rotation angles, of other unconstrained joints of the jointed model. In this manner, the jointed model interactively responds to user input by "following" the changes to the manipulated joint.

Inverse kinematics can also be applied to models without joints. For example, the pose or realized geometry of a model may be defined by one or more equations or functions. Parameters such as equation coefficients or function inputs may be used to specify changes in the shape of the model. For example, a three-dimensional surface or volume may be defined by coefficients of an equation.

Embodiments of the invention may be used with models defined with or without joints. In general, the pose of a jointed or unjointed model is defined by one or more pose degrees of freedom. A control knot specifies the value of a pose degrees of freedom at a specific time. The value of a control knot for a pose degree of freedom is referred to as a pose attribute value. A pose degree of freedom is an independent input that directly determines a model's pose. The pose degrees of freedom may correspond with joint positions and/or joint rotation angles of jointed models, the parameters representing equation coefficients or function inputs, or any other type of parameter specifying all or a portion of the shape of a model.

In general, inverse kinematics uses pose constraints and pose constraint functions to determine poses of models. A pose constraint specifies a desired aspect of a pose. Examples of pose constraints include desired joint positions; desired joint angles; desired values of arbitary metrics of model shape, such as derivatives, curvatures, and continuities of model shapes; and desired values of aggregate attributes of joints, model surfaces or volumes, or any other aspect of a pose or model shape. For example, a joint position value representing a desired hand position of a model may be defined as a pose constraint. In another example, a constant curvature of a model shape may be defined as a pose constraint.

Pose contraints may be expressed in the same or a different form or type than that used by the pose degrees of freedom defining the pose of a model. For example, a pose constraint can specify a joint position value representing a desired hand position of a model. However, the pose degrees of freedom that define the pose of the model may or may not be expressed as joint positions. For example, the values of pose degrees of freedom may represent joint rotation angles in a hierarchy of joints.

As discussed in detail below, a pose constraint function evaluates the pose of the model to determine how well the pose satisfies one or more pose constraints. For example, a pose constraint function can determine how far a joint's current position is from the desired joint position defined by a pose constraint. In some cases, the pose constraint function may be able to directly compare the values of pose degrees of freedom with pose constraints. For example, if a pose degree of freedom value specifies a joint position and the pose constraint specifies a desired joint position, then the pose constraint function can directly compare these two values to determine how well the pose defined at least in part by the pose degree of freedom satisfies the pose constraint.

In other cases, the pose constraint function cannot directly compare pose degrees of freedom with pose constraints. For example, if pose degrees of freedom specify joint rotation angles in a hierarchy of joints, but a pose constraint specifies a desired joint position of one of these joints, then the pose constraint function may apply a sequence of hierarchical transformations defined by the joint rotation angles to determine a joint's current position. The pose constraint function may then compare the calculated joint position with the desired joint position specified by the pose constraint.

In another example, a pose constraint function may evaluate the shape or surfaces of a model to determine a model curvature. This curvature or a value derived from the curvature, such as its derivative, may be compared with a pose constraint specifying a desired curvature or an aspect of the curvature.

A model may be associated with multiple pose constraint functions, each of which specifies how well the current pose of the model satisfies one or more pose constraints.

Figure 2:
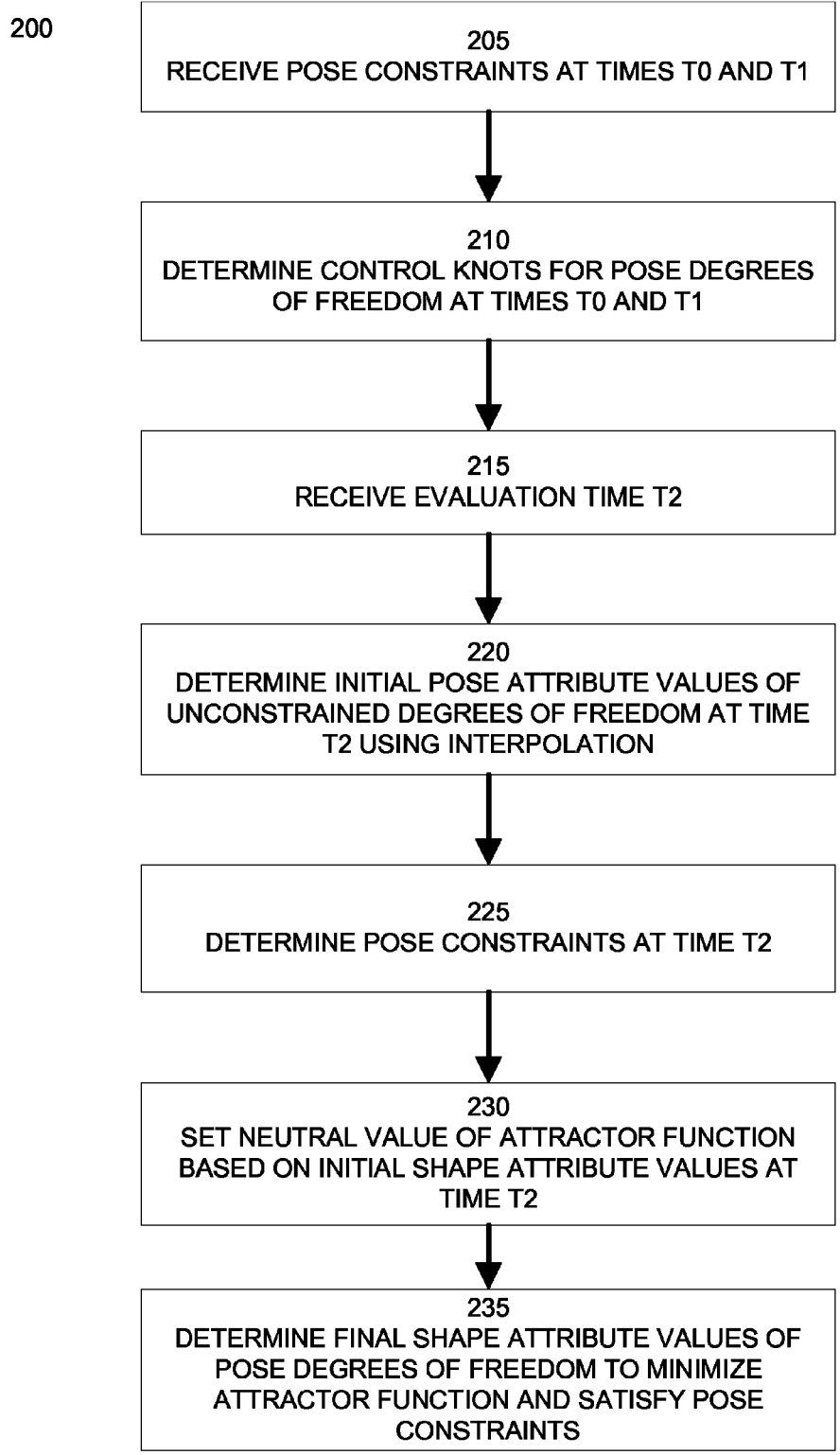
FIG. 2 illustrates a method of interpolating joint attributes using inverse kinematics according to an embodiment of the invention.

FIG. 2 illustrates a method 200 of interpolating pose degrees of freedom using inverse kinematics according to an embodiment of the invention. Step 205 receives pose constraints at two or more different time values, referred to as time T0 and T1. Each pose constraint represents a desired aspect of a pose of a model at a specific time. For example, a pose constraint may specify all or a portion of a position, angle, scaling, shearing, or any other attribute of a pose degree of freedom at a specific time. A pose constraint may also specify arbitrary metrics of model shape, such as derivatives, curvatures, and continuities of model shapes; and aggregate attributes of joints or pose degrees of freedom, model surfaces or volumes, or any other aspect of a pose or model shape. The pose constraints may be specified by a user or an application. In an embodiment, the pose constraints for a "pose" of a model may be specified at several different times, rather than at a single discrete time. In this embodiment, each pose degree of freedom associated with a pose constraint is interpolated from pose constraints at its respective times.

Step 210 determines control knots for at least a portion of the pose degrees of freedom at the times T0 and T1. A control knot specifies a pose attribute value of a pose degree of freedom, such as a joint attribute or other type of parameter input, at a specific time. In some cases, pose constraints may directly limit some of the pose degrees of freedom of a model, for example by specifying a desired joint position, desired joint angle, or other desired attribute value for a specific pose degree of freedom. For these pose constraints, step 210 defines control knots at time T0 and/or T1 for these directly constrained pose degrees of freedom.

In a further embodiment, step 210 traverses the portions of a graph representing a hierarchy of pose degrees of freedom, such as a joint hierarchy in the jointed model, between constrained pose degrees of freedom to identify unconstrained pose degrees of freedom that require control knots. In this embodiment, step 210 will define control knots at time T0 and T1 for any unconstrained pose degrees of freedom located between two directly constrained pose degrees of freedom in this graph of the joint hierarchy. Step 210 may optionally not define control knots for unconstrained pose degrees of freedom on other portions of the hierarchy graph. This allows control knots to be sparsely specified for the model.

In an embodiment, step 210 may use any inverse kinematic technique known in the art to determine the control knots for the unconstrained pose degrees of freedom at times T0 and T1.

Step 215 receives an evaluation time T2. The evaluation time T2 may be any moment in time other than times T0 and T1 in which the user, an animation tool, or any other application, such as a renderer or simulation application, wants to determine the pose or realized geometry of all or a portion of the model.

Step 220 determines an initial pose or set of pose attribute values of the model at the evaluation time T2 by interpolating pose attribute values for each unconstrained pose degree of freedom having any control knots defined at times T0 and T1. Step 220 may use linear or non-linear interpolation, such as a spline interpolation, and may rely on a pose degree of freedom's control knots at times T0 and T1 as well as control knots at any other time for this pose degree of freedom.

Similarly, step 225 then determines pose constraints at the evaluation time T2 by interpolation from the pose constraints at times T0 and T1. Like step 220, step 230 may use any type of linear or non-linear interpolation to determine the pose constraints at the evaluation time T2.

Step 230 defines an attractor function adapted to evaluate the overall suitability of the shape or pose of the model. For example, an attractor function may determine the potential energy of the model for a given pose. As discussed above, each joint of a jointed model may be associated with a rotation spring force of the form $F=k(\Delta\theta)$, where $\Delta\theta$ is the difference between a joint's current rotation angle and its angle in the rest pose and k is a joint spring constant, and a potential energy of $U=\frac{1}{2}k\Delta\theta^2$. Other example attractor functions may be based on attributes such as the curvature of the model or the continuity, derivatives, or other aggregate attributes of joints, pose degrees of freedom, or model surfaces or volumes.

In an embodiment, step 230 sets a neutral value of the attractor function based on the pose attribute values of the unconstrained pose degrees of freedom at the evaluation time T2. The neutral value of the attractor function represents a desired characteristic of the model shape or geometry, such as a potential energy minimum or a constant curvature. The desired shape of the model represented by the neutral value of the attractor function may be based on the pose attribute values of all or a portion of the degrees of freedom of the model, on values derived therefrom, or on any other attribute of the shape or pose of the model.

In the example of a jointed model, step 230 may set the rest pose angle of each unconstrained joint (i.e. the neutral position of the joint's spring force) to be the joint's rotation angle in the initial pose as determined in step 220. An attractor function representing the potential energy of any other pose of the model will be determined from the deviations of the unconstrained joints from their respective rest pose angles.

After step 230 has defined an attractor function for the model at the evaluation time T2, Step 235 then determines final pose attribute values of the model by specifying a final set of pose attribute values that satisfies the pose constraints associated with model at the evaluation time and minimizes the difference between the value of the attractor function for the pose attribute values and the neutral value of attractor function.

For example, if the neutral value of the attractor function represents a minimum potential energy of the model, then step 235 determines a final set of pose attribute values that satisfy the constraints associated with the model and minimizes the potential energy of the unconstrained pose degrees of freedom of the model. For example, step 235 may manipulate the pose attribute values of the unconstrained pose degrees of freedom to minimize the root mean square error of the unconstrained pose degrees of freedom from their rest pose angles associated with the neutral value of the attractor function. Following step 235, the model arranged according to its final pose attribute values or final pose may be displayed to a user, output to another application, such as a renderer or simulation application, or stored for future use by the animation tool or any other application.

In an embodiment, because the pose attribute values at the evaluation time T2 are determined in a time coherent manner, for example by interpolating between control knots at times T0 and T1, the attractor function defined by step 230 based on the pose attribute values at the evaluation time T2 will also be time coherent. Using this time coherent attractor function to direct the determination of the final pose attribute values at the evaluation time, the final pose attribute values will often be time coherent as well. Thus, this embodiment produces fluid and realistic looking animations, often with little or no temporal discontinuities, without requiring animation tools to incrementally determine model poses at every previous frame up to the desired evaluation time.

In a further embodiment, users can add keyframes or additional control knots to improve the smoothness and fluidity of interpolation between previously defined keyframes or control knots. In this embodiment, a user may select any evaluation time between previously defined control knots and add a new pose constraint at the evaluation time. The new pose constraint added at the evaluation time may be associated with a one or more of pose degree of freedoms affected by the pose constraints defined at times T0 and/or T1. Additionally, a new pose constraint added at the evaluation time may affect a pose degree of freedom unaffected by the pose constraints defined for times T0 and/or T1.

In response to the new pose constraint, the time coherent attractor function is updated such that the neutral value of the time coherent attractor function is based at least in part on the new pose constraint. The new pose constraint may set a pose degree of freedom to a new pose attribute value that was not previously defined at the evaluation time. This can be used to correct, modify, or refine the animation of the model between the previously defined keyframes or control knots.

Additionally, the new pose constraint may set a pose degree of freedom to a pose attribute value previously specified at the evaluation time. In this case, the time coherent attractor function is modified so that this pose attribute value represents a neutral position of its associated pose degree of freedom. For example, a joint at an evaluation time may have a neutral position of 0 degrees and an actual position of 30 degrees, due to the effect of other joint constraints. By adding a pose constraint for this joint setting it to 30 degrees, the neutral position of this joint at the evaluation time is changed to 30 degrees as well. This additional pose constraint reduces the potential energy of the current pose of the model, making interpolation smoother and less prone to temporal discontinuities at other nearby times.

Figure 3A:
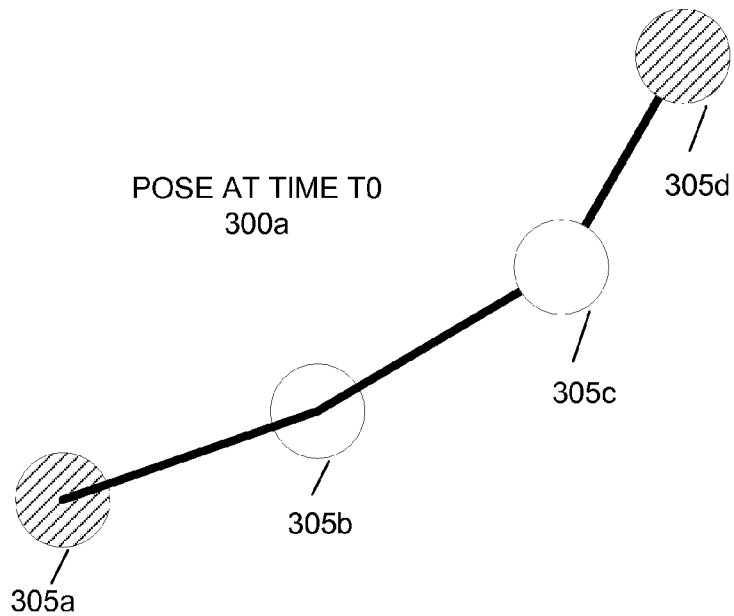
FIGS. 3A-3E illustrate an example application of interpolating joint attributes according to an embodiment of the invention.

FIGS. 3A-3E illustrate an example application of interpolating joint attribute pose degrees of freedom according to an embodiment of the invention. FIG. 3A illustrates first pose 300a of an example jointed model at a time T0. The example jointed model includes joints 305a-305d. Joints 305a and 305d have been constrained to the positions shown in FIG. 3A, while joints 305b and 305c are unconstrained. In one example, the positions or other joint attributes of joints 305b and 305c are determined using inverse kinematics from the constrained joints 305a and 305d.

Figure 3B:
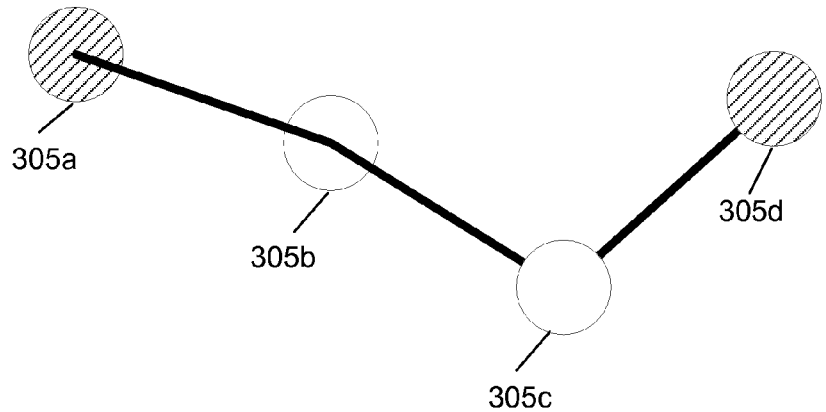

Similarly, FIG. 3B illustrates a second pose 300b of the example jointed model at a time T1. In the second pose 300b, joint 305a remains constrained to the same position as in pose 300a, while joint 305d is constrained to a different position. Unconstrained joints 305b and 305c are also in different positions in pose 300b than in pose 300a, due to the movement of constrained joint 305d.

Figure 3C:
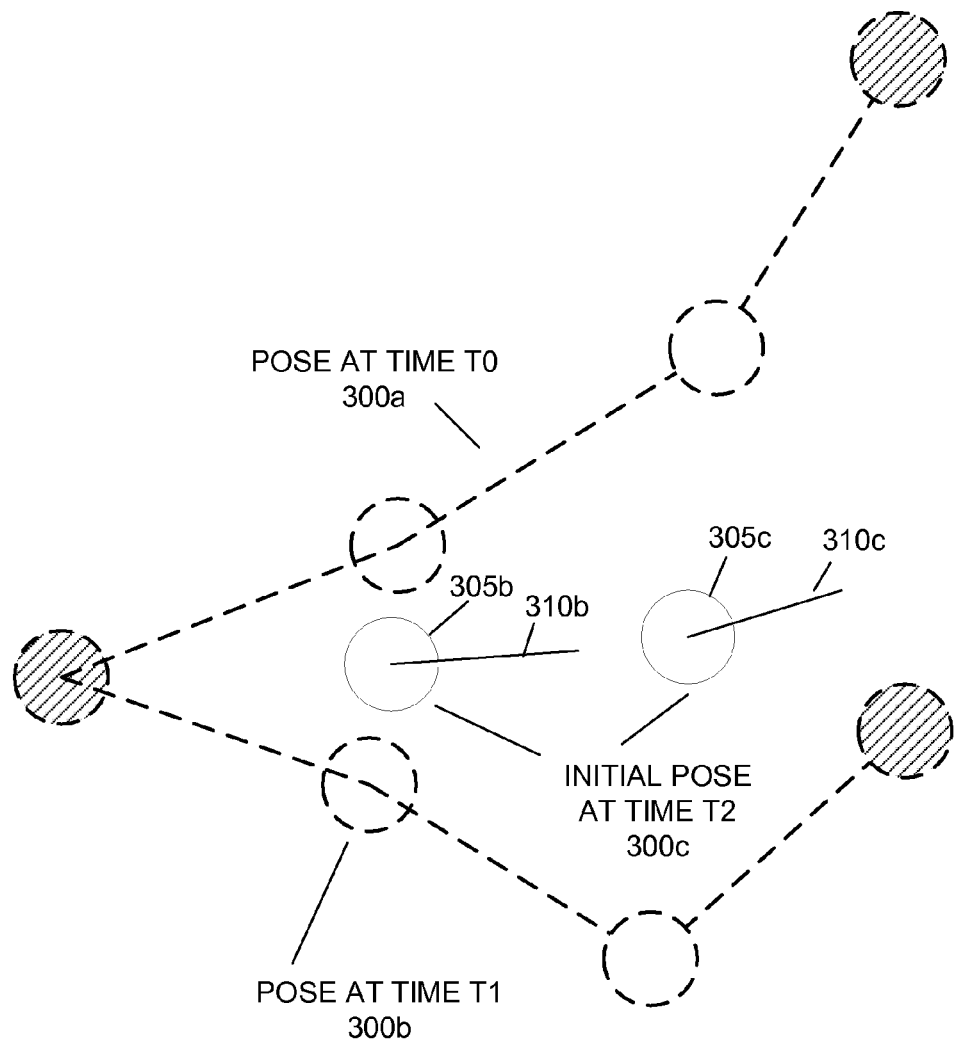
Figure 3D:
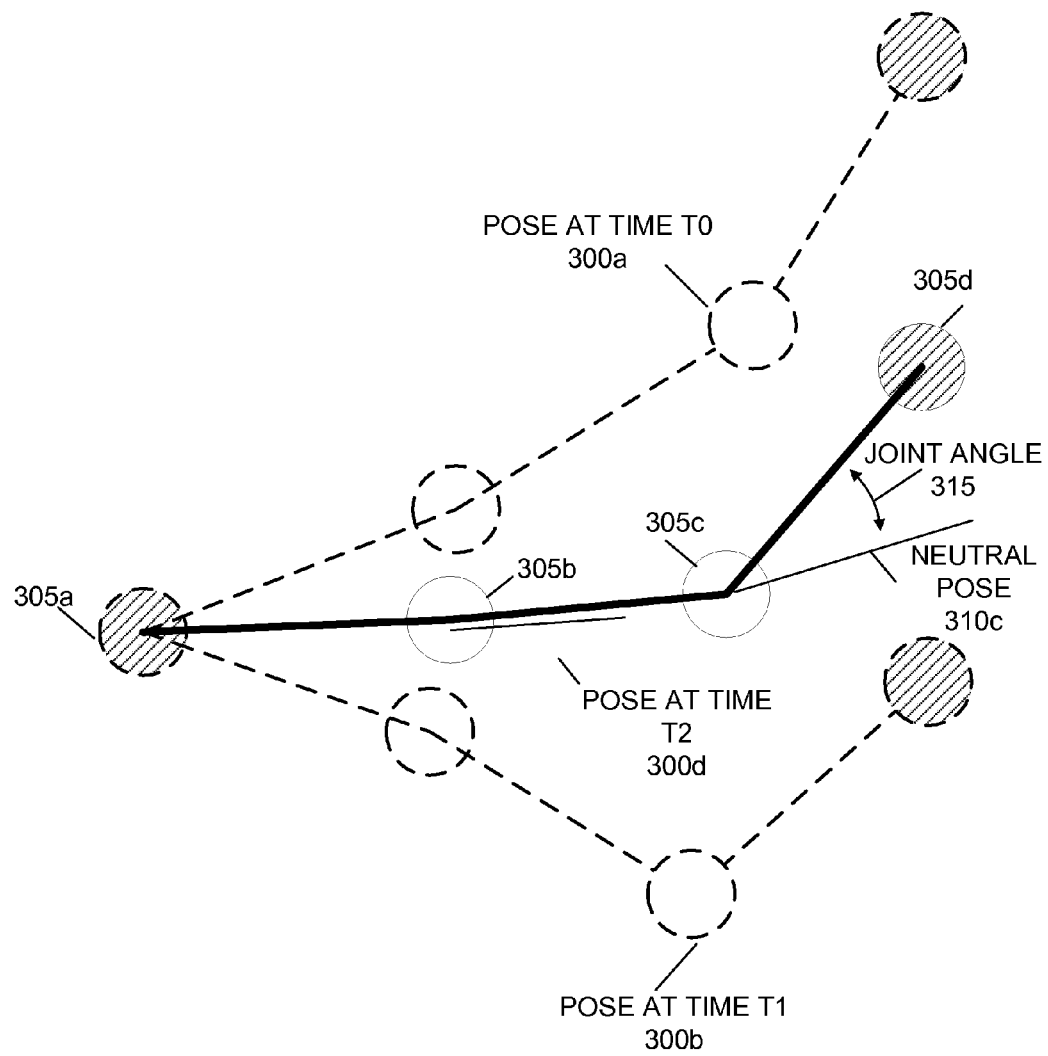
Figure 3E:
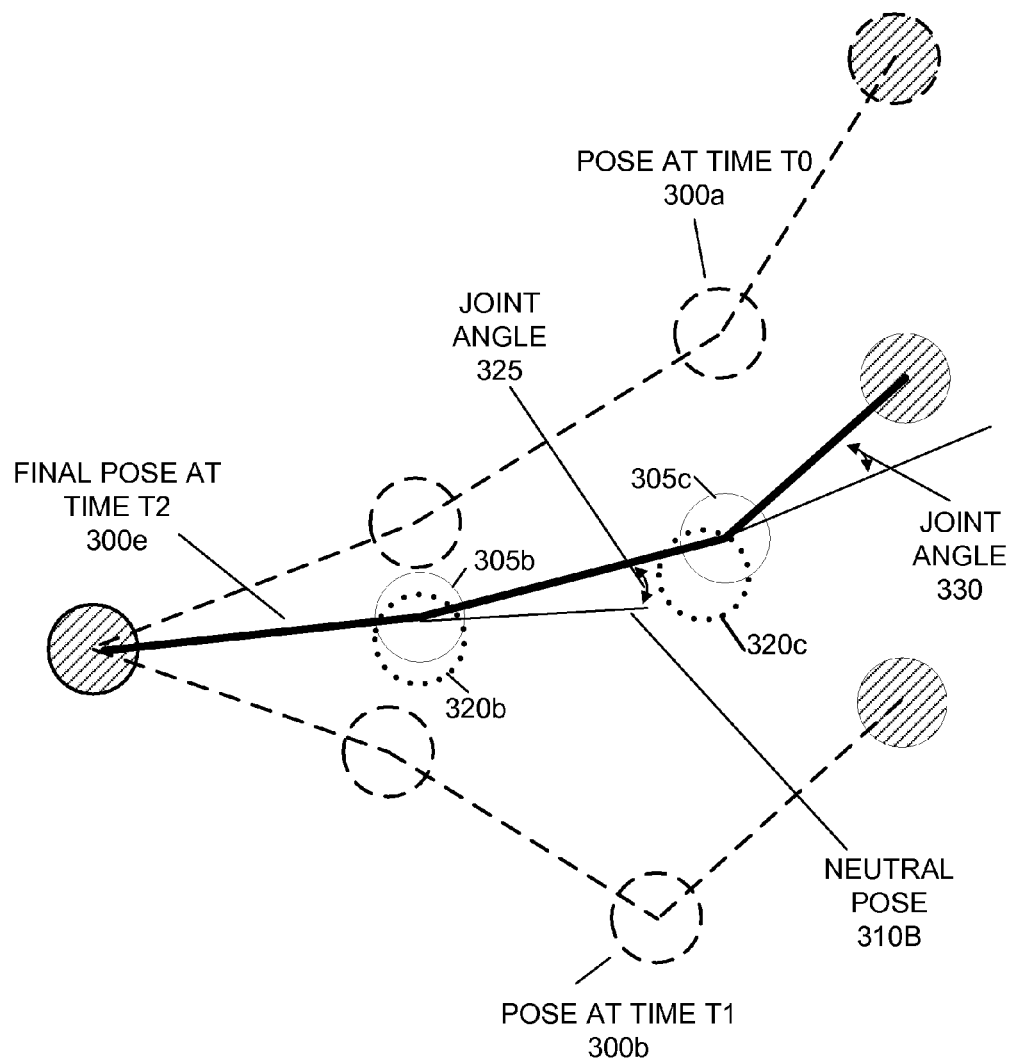

As described by method 200, an embodiment of the invention determines an intermediate pose of a jointed model at an evaluation time T2 by first interpolating the joint attributes of the unconstrained joints to define an initial pose. FIG. 3C illustrates an example initial pose 300c of the unconstrained joints 305b and 305c at the evaluation time T2. For illustration, the poses 300a and 300b of the example jointed model are shown in FIGS. 3C, 3D, and 3E as dotted lines. In this example, the positions of unconstrained joints 305b and 305c are determined by interpolating between their respective positions in the poses 300a and 300b.

Additionally, the unconstrained joints 305b and 305c are assigned neutral pose joint attributes. The neutral pose joint attributes are associated with a neutral value of an attractor function and in this example represent a minima of potential energy for the jointed model. For example, joints 305b and 305c are assigned neutral pose joint attributes 310b and 310c. In this example, these neutral pose joint attributes 310 represent the joint angles where each joint's rotation spring force is zero.

Following the specification of the initial pose 300c for the unconstrained joints 305b and 305c, an embodiment of the invention determines the position and other joint attributes of the constrained joints at the evaluation time T2. FIG. 3D illustrates an example pose 300d of the constrained and unconstrained joints 305 at the evaluation time T2. In this example, the positions of constrained joints 305a and 305d are determined by interpolating between their respective positions in the poses 300a and 300b. Constrained joint 305a remains in the same position in pose 300d as in the prior poses 300a and 300b, because this joint does not move between poses 300a and 300b. Constrained joint 305d moves to an intermediate position in pose 300d between its positions in poses 300a and 300b.

Because of the constrained joint 305d is connected with unconstrained joint 305c, the joint rotation angle or other joint attributes of joint 305c will change from its neutral pose 310c to a new joint angle 315. Conversely, the joint rotation angle of joint 305b will remain in its neutral pose 310b, as joint 305c does not change position between poses 300c and 300d.

Because the unconstrained joint 305c has a joint rotation angle 315 different from its neutral pose 310c, the potential energy or error value of the jointed model is increased by an amount proportional to the difference between the joint rotation angle 315 and its neutral pose joint angle 310c. An embodiment of the invention determines a final pose of the jointed model by minimizing the error or potential energy over all of the unconstrained joints.

FIG. 3E illustrates a final pose 300e of the example jointed model with the potential energy or error introduced in pose 300d minimized over the unconstrained joints 305b and 300d. In this example, joints 305b and 305c have been moved from their positions in pose 300d, shown in FIG. 3E as dotted circles 320b and 320c respectively, to new positions that minimize the total potential energy or error for all of the unconstrained joints in the jointed model. In this example, joint 305b is moved from its neutral pose joint angle 310b to a new joint angle 325. Additionally, joint 305c now has a joint angle 330. In this example, the total potential energy of the jointed model in pose 300e due to joint angles 325 and 330 is less than the potential energy of the jointed model in pose 300d due to joint angle 315.

In the above example, the control knots for the poses 300a and 300b are defined at two discrete times, T0 and T1 respectively. However, control knots for a single pose may be spread out at multiple times. For example, a first pose may be defined by control knots at times T0, T1, and T2 and a second pose may be defined by control knots at times T4, T5, and T6. In this example, an embodiment of the invention determines a value for each pose attribute, such as a joint position or other parameter, at an evaluation time by interpolating between the control knots associated with each pose attribute, ignoring the control knots associated with unrelated pose attributes. For example, if a first joint is associated with control knots at times T0 and T4 in the first and second poses, then an embodiment of the invention will interpolate between times T0 and T4 to determine the interpolated position of this joint at the evaluation time. If a second joint is associated with control knots at times T1 and T5 in the first and second poses, then an embodiment of the invention will interpolate between times T1 and T5 to determine the interpolated position of this second joint at the evaluation time.

Figure 4:
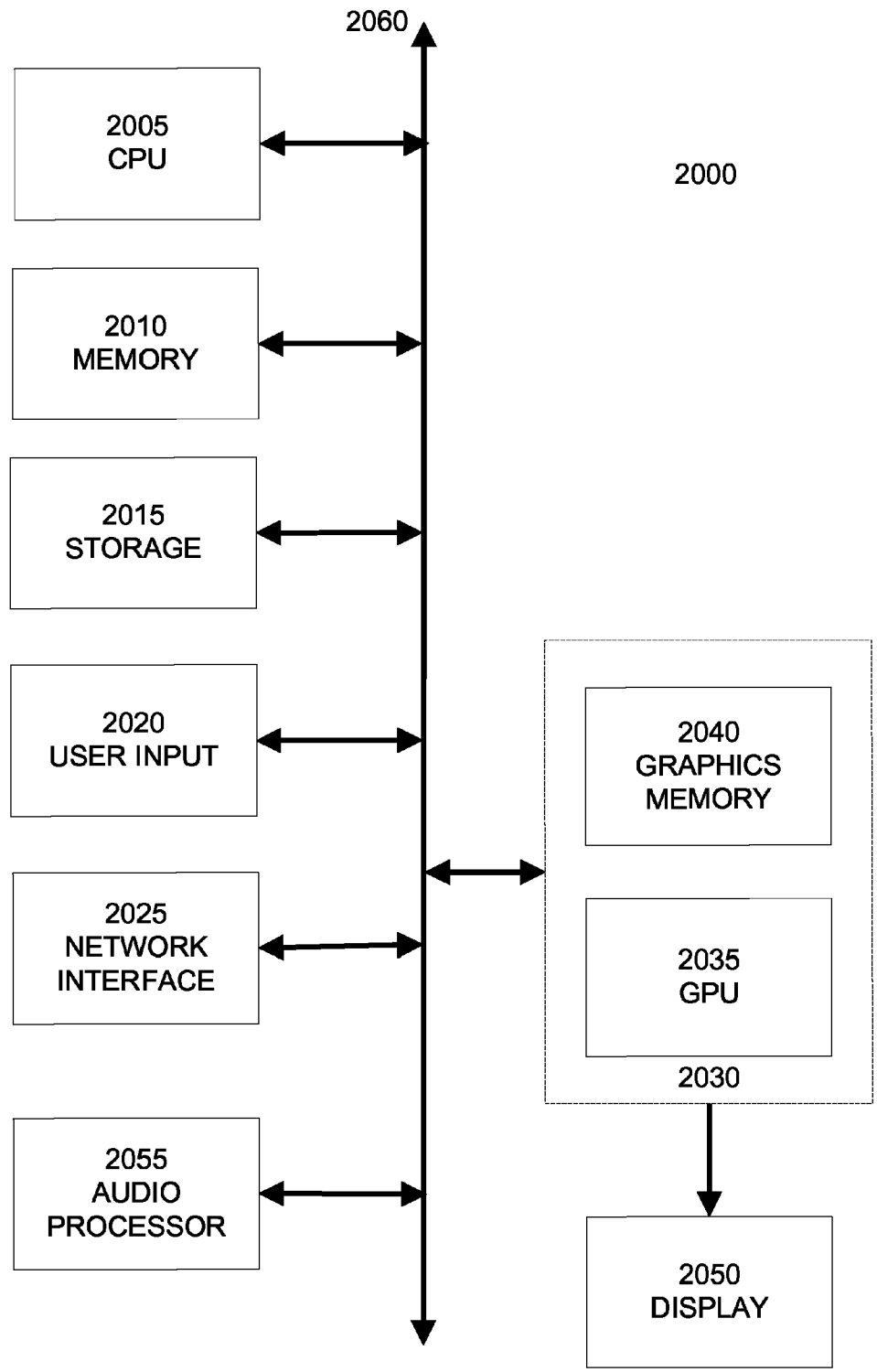
FIG. 4 illustrates an example computer system suitable for implementing embodiments of the invention.

FIG. 4 illustrates an example computer system 2000 suitable for implementing embodiments of the invention. FIG. 4 is a block diagram of a computer system 2000, such as a personal computer, video game console, personal digital assistant, or other digital device, suitable for practicing an embodiment of the invention. Computer system 2000 includes a central processing unit (CPU) 2005 for running software applications and optionally an operating system. CPU 2005 may be comprised of one or more processing cores. Memory 2010 stores applications and data for use by the CPU 2005. Storage 2015 provides non-volatile storage for applications and data and may include a computer-readable storage medium such as fixed or removable hard disk drives, flash memory devices, and CD-ROM, DVD-ROM, Blu-ray, HD-DVD, or other magnetic, optical, or solid state storage devices.

User input devices 2020 communicate user inputs from one or more users to the computer system 2000, examples of which may include keyboards, mice, joysticks, digitizer tablets, touch pads, touch screens, still or video cameras, motion sensors, and/or microphones. Network interface 2025 allows computer system 2000 to communicate with other computer systems via an electronic communications network, and may include wired or wireless communication over local area networks and wide area networks such as the Internet and cellular communications networks. An audio processor 2055 is adapted to generate analog or digital audio output from instructions and/or data provided by the CPU 2005, memory 2010, and/or storage 2015. The components of computer system 2000, including CPU 2005, memory 2010, data storage 2015, user input devices 2020, network interface 2025, and audio processor 2055 are connected via one or more data buses 2060.

A graphics subsystem 2030 is further connected with data bus 2060 and the components of the computer system 2000. The graphics subsystem 2030 includes at least one graphics processing unit (GPU) 2035 and graphics memory 2040. Graphics memory 2040 includes a display memory (e.g., a frame buffer) used for storing pixel data for each pixel of an output image. Graphics memory 2040 can be integrated in the same device as GPU 2035, connected as a separate device with GPU 2035, and/or implemented within memory 2010.

Pixel data can be provided to graphics memory 2040 directly from the CPU 2005. In some implementations, instructions and/or data representing a scene are provided to a renderfarm or a set of server computers, each similar to computer system 2000, via the network interface 2025 or storage 2015. The renderfarm generates one or more rendered images of the scene using the provided instructions and/or data. These rendered images may be stored on computer-readable media in a digital format and optionally returned to the computer system 2000 for display.

Alternatively, CPU 2005 provides the GPU 2035 with data and/or instructions defining the desired output images, from which the GPU 2035 generates the pixel data of one or more output images. The data and/or instructions defining the desired output images can be stored in memory 2010 and/or graphics memory 2040. In an embodiment, the GPU 2035 includes 3D rendering capabilities for generating pixel data for output images from instructions and data defining the geometry, lighting, shading, texturing, motion, and/or camera parameters for a scene. The GPU 2035 can further include one or more programmable execution units capable of executing shader programs. GPU 2035 can be comprised of one or more graphics processing unit cores.

The CPU 2005, renderfarm, and/or GPU 2035 can employ any surface or volume rendering technique known in the art to create one or more rendered images from the provided data and instructions, including rasterization, scanline rendering, REYES or micropolygon rendering, ray casting, ray tracing, image-based rendering techniques, and/or combinations of these and any other rendering or image processing techniques known in the art.

The graphics subsystem 2030 periodically outputs pixel data for an image from graphics memory 2040 to be displayed on display device 2050. Display device 2050 is any device capable of displaying visual information in response to a signal from the computer system 2000, including CRT, LCD, plasma, OLED, and SED displays, as well as film recorders adapted to reproduce computer generated images on photographic film. Computer system 2000 can provide the display device 2050 with an analog or digital signal.

In embodiments of the invention, CPU 2005 is one or more general-purpose microprocessors having one or more homogenous or heterogeneous processing cores. In further embodiments, all or a portion of the graphics subsystem 2030 or GPU 2035 is integrated into CPU 2005. In still further embodiments, all or a portion of the graphics subsystem 2030 may be omitted and software executed by CPU 2005 may perform the functions of the graphics subsystem 2030.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of interpolating pose attributes for a model, the method comprising:
   receiving first pose constraints associated with a first pose at least at a first time value;
   receiving second pose constraints associated with a second pose at least at a second time value;
   receiving an evaluation time value;
   determining a neutral pose at the evaluation time value for the model;
   determining third pose constraints associated with the evaluation time value from the first and second pose constraints;
   determining a time coherent attractor function at the evaluation time, wherein the time coherent attractor function is adapted to determine time coherent attractor values based on poses of the model at the evaluation time;
   determining a third pose that satisfies the third pose constraints at the evaluation time value and minimizes a difference between a value of the time coherent attractor function for the third pose and a neutral value of the time coherent attractor function for the neutral pose; and
   rendering at least one computer graphics image including at least a portion of the model in the third pose;
   wherein determining the neutral pose at the evaluation time value comprises:
   interpolating between pose attribute values at the first and second time values for each of at least a portion of a set of pose degrees of freedom of the model; and
   wherein interpolating between pose attribute values at the first and second time values comprises:
   determining a first portion of the pose attribute values associated with the first time value for each of the portion of the set of pose degrees of freedom using inverse kinematics and the first pose constraints; and
   determining a second portion of the pose attribute values associated with the second time value for each of the portion of the set of pose degrees of freedom using inverse kinematics and the second pose constraints.

2. The method of claim 1, wherein interpolating between pose attribute values at the first and second time values comprises:
   receiving first control knots defining a third portion of the pose attribute values associated with the first time value; and
   receiving second control knots defining a fourth portion of the pose attribute values associated with the second time value.

3. The method of claim 1, wherein determining the neutral pose at the evaluation time value comprises:
   identifying a first subset of pose degrees of freedom associated with the first pose constraints and/or the second pose constraints;
   traversing a graph associated with pose degrees of freedom of the model to identify a second subset of the pose degrees of freedom of the model located between at least two of the first subset of pose degrees of freedom in the graph; and
   determining pose attributes for at least the second subset of pose degrees of freedom at the evaluation time value to determine in the neutral pose.

4. The method of claim 1, wherein determining the third pose constraints for the evaluation time value comprises:
   interpolating between the first pose constraints associated with the first time value and the second pose constraints associated with the second time value to determine the third pose constraints.

5. The method of claim 1, wherein the first pose constraints are specified at least in part by a user.

6. The method of claim 1, wherein the first pose constraints are specified at least in part by an application.

7. The method of claim 1, wherein the first pose constraints associated with the first pose are specified at a first plurality of times and wherein the second pose constraints associated with the second pose are specified at a second plurality of times.

8. The method of claim 1, wherein:
   the pose attribute values associated with the portion of the set of pose degrees of freedom include a pose attribute value of a first type; and
   the first pose constraints include at least one pose constraint of the first type.

9. The method of claim 1, wherein:
   the pose attribute values associated with the portion of the set of pose degrees of freedom include a pose attribute value of a first type; and
   the first pose constraints include at least one pose constraint of a second type different than the first type.

10. A method of interpolating pose attributes for a model, the method comprising:
    receiving first pose constraints associated with a first pose at least at a first time value;
    receiving second pose constraints associated with a second pose at least at a second time value;
    receiving an evaluation time value;
    determining a neutral pose at the evaluation time value for the model;
    determining third pose constraints associated with the evaluation time value from the first and second pose constraints;
    determining a time coherent attractor function at the evaluation time, wherein the time coherent attractor function is adapted to determine time coherent attractor values based on poses of the model at the evaluation time;
    determining a third pose that satisfies the third pose constraints at the evaluation time value and minimizes a difference between a value of the time coherent attractor function for the third pose and a neutral value of the time coherent attractor function for the neutral pose; and rendering at least one computer graphics image including at least a portion of the model in the third pose;

wherein determining the third pose comprises:

minimizing a root mean square difference between neutral pose attribute values defining at least a portion of the neutral pose and third pose attribute values defining at least a corresponding portion of the third pose.

11. The method of claim 10, wherein the time coherent attractor function is adapted to have the neutral value in response to pose degrees of freedom having the neutral pose attribute values.

12. A method of interpolating pose attributes for a model, the method comprising:

receiving first pose constraints associated with a first pose at least at a first time value;

receiving second pose constraints associated with a second pose at least at a second time value;

receiving an evaluation time value;

determining a neutral pose at the evaluation time value for the model;

determining third pose constraints associated with the evaluation time value from the first and second pose constraints;

determining a time coherent attractor function at the evaluation time, wherein the time coherent attractor function is adapted to determine time coherent attractor values based on poses of the model at the evaluation time;

determining a third pose that satisfies the third pose constraints at the evaluation time value and minimizes a difference between a value of the time coherent attractor function for the third pose and a neutral value of the time coherent attractor function for the neutral pose; and rendering at least one computer graphics image including at least a portion of the model in the third pose;

wherein the first pose constraints are selected from a group consisting of:

a joint rotation angle; a joint position; a joint coordinate space; a joint scaling factor; a joint shearing factor; a shape equation coefficient; and a shape function parameter; arbitary metrics of model shape, including derivatives, curvatures, and continuities of model shapes; and aggregate attributes of pose degrees of freedom, model surfaces or volumes.

13. A method of interpolating pose attributes for a model, the method comprising:

receiving first pose constraints associated with a first pose at least at a first time value;

receiving second pose constraints associated with a second pose at least at a second time value;

determining a time coherent attractor function having neutral values over a range of evaluation times between the first time and the second time, wherein the time coherent attractor function is adapted to determine time coherent attractor value based on poses of the model at the evaluation times;

receiving a selection of one of the evaluation times;

determining a neutral pose at the evaluation time value for the model;

determining third pose constraints associated with the evaluation time value from the first and second pose constraints;

determining a third pose that satisfies the third pose constraints at the evaluation time value and minimizes a difference between a value of the time coherent attractor function for the third pose and a neutral value of the time coherent attractor function for the neutral pose;

receiving a fourth pose constraint associated with the third pose at the evaluation time;

in response to receiving the fourth pose constraint, defining a modified time coherent attractor function over the range of evaluation times;

rendering at least one computer graphics image including at least a portion of the model in the third pose;

wherein the fourth pose constraint is adapted to constrain at least a selected pose degree of freedom; and wherein the selected lose degree of freedom is not constrained by the first and second pose constraints.

14. The method of claim 13, wherein the fourth pose constraint is specified at least in part by a user.

15. The method of claim 13, wherein the fourth pose constraint is specified at least in part by an application.

16. The method of claim 13, wherein:

the third pose is defined using pose degrees of freedom including a pose attribute value of a first type; and the fourth pose constraint has the first type.

17. The method of claim 13, wherein:

the third pose is defined using pose degrees of freedom including a pose attribute value of a first type; and the fourth pose constraint has a second type different than the first type.

18. A method of interpolating pose attributes for a model, the method comprising:

receiving first pose constraints associated with a first pose at least at a first time value;

receiving second pose constraints associated with a second pose at least at a second time value;

determining a time coherent attractor function having neutral values over a range of evaluation times between the first time and the second time, wherein the time coherent attractor function is adapted to determine time coherent attractor value based on poses of the model at the evaluation times;

receiving a selection of one of the evaluation times;

determining a neutral pose at the evaluation time value for the model;

determining third pose constraints associated with the evaluation time value from the first and second pose constraints;

determining a third pose that satisfies the third pose constraints at the evaluation time value and minimizes a difference between a value of the time coherent attractor function for the third pose and a neutral value of the time coherent attractor function for the neutral pose;

receiving a fourth pose constraint associated with the third pose at the evaluation time;

in response to receiving the fourth pose constraint, defining a modified time coherent attractor function over the range of evaluation times;

rendering at least one computer graphics image including at least a portion of the model in the third pose;

wherein the fourth pose constraint is adapted to constrain at least a selected pose degree of freedom; and wherein the selected pose degree of freedom is also constrained by at least one of the first and second pose constraints.

19. A non-transitory computer-readable storage medium including instructions adapted to direct a computer to perform an operation, the operation comprising:

receiving first pose constraints associated with a first pose at least at a first time value;

receiving second pose constraints associated with a second pose at least at a second time value;
receiving an evaluation time value;
determining a neutral pose at the evaluation time value for the model;
determining third pose constraints associated with the evaluation time value from the first and second pose constraints;
determining a time coherent attractor function at the evaluation time, wherein the time coherent attractor function is adapted to determine time coherent attractor values based on poses of the model at the evaluation time; and
determining a third pose that satisfies the third pose constraints at the evaluation time value and minimizes a difference between a value of the time coherent attractor function for the third pose and a neutral value of the time coherent attractor function for the neutral pose;
wherein determining the neutral pose at the evaluation time value comprises:
interpolating between pose attribute values at the first and second time values for each of at least a portion of a set of lose degrees of freedom of the model; and
wherein interpolating between pose attribute values at the first and second time values comprises:
determining a first portion of the pose attribute values associated with the first time value for each of the portion of the set of pose degrees of freedom using inverse kinematics and the first pose constraints; and
determining a second portion of the pose attribute values associated with the second time value for each of the portion of the set of pose degrees of freedom using inverse kinematics and the second pose constraints.

20. The computer-readable storage medium of claim 19, wherein interpolating between pose attribute values at the first and second time values comprises:
receiving first control knots defining a third portion of the pose attribute values associated with the first time value; and
receiving second control knots defining a fourth portion of the pose attribute values associated with the second time value.

21. The computer-readable storage medium of claim 19, wherein determining the neutral pose at the evaluation time value comprises:
identifying a first subset of pose degrees of freedom associated with the first pose constraints and/or the second pose constraints;
traversing a graph associated with pose degrees of freedom of the model to identify a second subset of the pose degrees of freedom of the model located between at least two of the first subset of pose degrees of freedom in the graph; and
determining pose attributes for at least the second subset of pose degrees of freedom at the evaluation time value to determine in the neutral pose.

22. The computer-readable storage medium of claim 19, wherein determining the third pose constraints for the evaluation time value comprises:
interpolating between the first pose constraints associated with the first time value and the second pose constraints associated with the second time value to determine the third pose constraints.

23. The computer-readable storage medium of claim 19, wherein the first pose constraints are specified at least in part by a user.

24. The computer-readable storage medium of claim 19, wherein the first pose constraints are specified at least in part by an application.

25. The computer-readable storage medium of claim 19, wherein the first pose constraints associated with the first pose are specified at a first plurality of times and wherein the second pose constraints associated with the second pose are specified at a second plurality of times.

26. The computer-readable storage medium of claim 19, wherein:
the pose attribute values associated with the portion of the set of pose degrees of freedom include a pose attribute value of a first type; and
the first pose constraints include at least one pose constraint of the first type.

27. The computer-readable storage medium of claim 19, wherein:
the pose attribute values associated with the portion of the set of pose degrees of freedom include a pose attribute value of a first type; and
the first pose constraints include at least one pose constraint of a second type different than the first type.

28. A non-transitory computer-readable storage medium including instructions adapted to direct a computer to perform an operation, the operation comprising:
receiving first pose constraints associated with a first pose at least at a first time value;
receiving second pose constraints associated with a second pose at least at a second time value;
receiving an evaluation time value;
determining a neutral pose at the evaluation time value for the model;
determining third pose constraints associated with the evaluation time value from the first and second pose constraints;
determining a time coherent attractor function at the evaluation time, wherein the time coherent attractor function is adapted to determine time coherent attractor values based on poses of the model at the evaluation time; and
determining a third pose that satisfies the third pose constraints at the evaluation time value and minimizes a difference between a value of the time coherent attractor function for the third pose and a neutral value of the time coherent attractor function for the neutral pose;
wherein determining the third pose comprises:
minimizing a root mean square difference between neutral pose attribute values defining at least a portion of the neutral pose and third pose attribute values defining at least a corresponding portion of the third pose.

29. The computer-readable storage medium of claim 28, wherein the time coherent attractor function is adapted to have the neutral value in response to pose degrees of freedom having the neutral pose attribute values.

30. A non-transitory computer-readable storage medium including instructions adapted to direct a computer to perform an operation, the operation comprising:
receiving first pose constraints associated with a first pose at least at a first time value;
receiving second pose constraints associated with a second pose at least at a second time value;
receiving an evaluation time value;
determining a neutral pose at the evaluation time value for the model;

determining third pose constraints associated with the evaluation time value from the first and second pose constraints;

determining a time coherent attractor function at the evaluation time, wherein the time coherent attractor function is adapted to determine time coherent attractor values based on poses of the model at the evaluation time; and determining a third pose that satisfies the third pose constraints at the evaluation time value and minimizes a difference between a value of the time coherent attractor function for the third pose and a neutral value of the time coherent attractor function for the neutral pose;

wherein the first pose constraints are selected from a group consisting of:

a joint rotation angle; a joint position; a joint coordinate space; a joint scaling factor; a joint shearing factor; a shape equation coefficient; and a shape function parameter; arbitary metrics of model shape, including derivatives, curvatures, and continuities of model shapes; and aggregate attributes of pose degrees of freedom, model surfaces or volumes.

* * * * *

UNITED STATES PATENT AND TRADEMARK OFFICE
CERTIFICATE OF CORRECTION

| | | |
|---|---|---|
| PATENT NO. | : 8,358,311 B1 | Page 1 of 1 |
| APPLICATION NO. | : 12/257257 | |
| DATED | : January 22, 2013 | |
| INVENTOR(S) | : Andrew Witkin | |

It is certified that error appears in the above-identified patent and that said Letters Patent is hereby corrected as shown below:

In the Claims Section:
        Claim 13, Column 14, Line 12, delete:
            "lose"
        and insert:
            --pose--

Claim 19, Column 15, Line 22, delete:
            "lose"
        and insert:
            --pose--

Signed and Sealed this
First Day of October, 2013

Teresa Stanek Rea
*Deputy Director of the United States Patent and Trademark Office*